(12) United States Patent
Kong et al.

(10) Patent No.: US 11,787,119 B2
(45) Date of Patent: Oct. 17, 2023

(54) POWDER FEEDER

(71) Applicant: C4 Carbides Limited, Newmarket (GB)

(72) Inventors: Choon Yen Kong, Newmarket (GB); Pavels Sevcenko, Newmarket (GB)

(73) Assignee: C4 Carbides Limited, Newmarket (GB)

( * ) Notice: Subject to any disclaimer, the term of this patent is extended or adjusted under 35 U.S.C. 154(b) by 32 days.

(21) Appl. No.: 17/192,769

(22) Filed: Mar. 4, 2021

(65) Prior Publication Data

US 2021/0291453 A1 Sep. 23, 2021

(30) Foreign Application Priority Data

Mar. 17, 2020 (GB) ..................................... 2003821

(51) Int. Cl.
*B29C 64/321* (2017.01)
*B33Y 40/00* (2020.01)
*B29C 64/371* (2017.01)

(52) U.S. Cl.
CPC .......... *B29C 64/321* (2017.08); *B29C 64/371* (2017.08); *B33Y 40/00* (2014.12)

(58) Field of Classification Search
CPC ... B29C 64/153; B29C 64/259; B29C 64/321; B29C 64/329; B29C 64/205; B29C 64/214; B29C 64/218; B29C 64/357; B29C 2043/3427; B22F 12/50; B22F 12/52; B22F 12/57; B01F 35/71; B01F 35/717; B01F 35/7173; B01F 35/71731
See application file for complete search history.

(56) References Cited

U.S. PATENT DOCUMENTS

| | | | |
|---|---|---|---|
| 4,726,715 A | 2/1988 | Steen et al. | |
| 7,232,543 B2 | 6/2007 | Celikkaya et al. | |
| 2016/0361874 A1* | 12/2016 | Park | B29C 64/357 |
| 2017/0014905 A1* | 1/2017 | Kawada | B22F 12/00 |
| 2019/0375157 A1 | 12/2019 | Fockele et al. | |
| 2020/0307074 A1* | 10/2020 | Tjellesen | B29C 64/241 |
| 2020/0376551 A1* | 12/2020 | Morganson | B23K 26/142 |
| 2021/0245256 A1* | 8/2021 | Gonzalez | B29C 64/153 |
| 2022/0111553 A1* | 4/2022 | Kitani | B33Y 10/00 |

FOREIGN PATENT DOCUMENTS

| | | | | |
|---|---|---|---|---|
| CN | 103173759 A | | 6/2013 | |
| DE | 102015005780 A1 | * | 12/2016 | ............. B22F 10/20 |
| EP | 2281677 A1 | | 2/2011 | |
| GB | 2568521 A | | 5/2019 | |
| WO | WO-2019175556 A1 | * | 9/2019 | ............... B22F 1/00 |

* cited by examiner

Primary Examiner — Joseph S Del Sole
Assistant Examiner — Ariella Machness
(74) *Attorney, Agent, or Firm* — Reinhart Boerner Van Deuren s.c.

(57) ABSTRACT

There is provided a powder feeder (10, 10') comprising a main chamber (12, 12') with a gas inlet (14, 14') and a powder outlet (16), at least one secondary chamber (20, 20') configured to receive powder and a shaver element (22, 40, 50), wherein the shaver element (22, 40, 50) is positioned directly above an opening (26, 26') in the at least one secondary chamber (20, 20'). The secondary chamber (20, 20') further comprises a piston (28, 28') movable towards the shaver element (22, 40, 50) so as to urge powder upwards. Examples of a shaver element include a rotatable screw (22), a conveyor belt (40) and a rotating disc (50) with protrusions (54).

12 Claims, 3 Drawing Sheets

POWDER FEEDER

This application claims priority to Great Britain Patent Application No. 2003821.2, filed on Mar. 17, 2020, which is incorporated by reference for all purposes as if fully set forth herein.

FIELD OF THE INVENTION

This invention relates to a powder feeder, and in particular powder feeder for use manufacturing processes using fine powder, such as additive powder manufacturing.

BACKGROUND TO THE INVENTION

In additive manufacturing, precise delivery of fine powders at a specific point in the manufacturing process is required. This is generally done using powder feeders with gravity fed hoppers filled with such powders. Issues are encountered when very fine, non-spherical, poor flowing and/or mixed and prone to segregation powders need to be delivered.

Fine and/or poor flowing powders and powder mixtures can agglomerate and clog the passages in the feeder which can lead to inconsistent flows, pulsing or complete blockage of the systems.

In powder delivery systems, where a mixture of different powders needs to be delivered, hoppers and feeding chambers tend to segregate the mixtures resulting in inconsistent compositions of powder in the manufacturing process. Such disruptions cause inconsistent output in the manufacturing process.

SUMMARY OF THE INVENTION

In accordance with the invention, there is provided a powder feeder, typically for use in additive manufacturing, comprising a main chamber with a gas inlet and a powder outlet, at least one secondary chamber configured to receive powder and a shaver element, such as a blade, brush, ridge or other abrading element, wherein the shaver element is positioned directly above an opening in the at least one secondary chamber. By positioning the shaver element directly above the secondary chamber, in use the shaver element is able to remove a thin layer of powder contained in the secondary chamber for exit through the outlet.

Preferably the at least one secondary chamber further comprises a piston or other actuator, movable towards the shaver element, such that in use the piston urges powder contained in the secondary chamber upwards towards the shaver element.

The at least one secondary chamber may be configured to receive partially compressed powder. Partially compressing the powder ensures a consistent packing density of the powder, with gas pockets or loosely packed areas with a lower density removed and powder segregation prevented.

The at least one secondary chamber may be disposed within the main chamber or alternatively the at least one secondary chamber may be externally connected to the main chamber.

The outlet is preferably positioned proximal the at least one secondary chamber so as to ensure the powder has to travel as short a distance as possible through the main chamber before exit. Desirably the distance from the at least one secondary chamber to the outlet is less than 20 mm.

A plurality of secondary chambers may be provided with is particularly of use when different powders need to be combined within the feeder. The plurality of secondary chambers may be linearly spaced apart and for such an arrangement the outlet is preferably disposed proximal to the last secondary chamber in the line. Alternatively the plurality of secondary chambers may be positioned around a common axis such that their openings are arranged to be in substantially the same horizontal plane. This arrangement is particularly suitable for an arrangement where the secondary chambers are disposed within the main chamber.

Preferably the at least one secondary chamber is detachable from the main chamber for ease of introducing powder into the secondary chamber.

The shaver element may comprise a rotatable screw and preferably an axis of rotation of the screw extends across the opening, such that in use rotation of the screw causes a thin layer of powder to be removed from the at least one secondary chamber and conveyed towards the outlet.

The screw is preferably rotated at a speed of between 100 to 1800 rpm.

The shaver element may alternatively comprise a conveyor belt which may comprise at least one ridged element, and preferably a plurality of ridged elements, to act as a blade.

The conveyor belt is preferably moveable at a speed of 0.1 to 7 m/minute.

The shaver element may be in the form of a circular disc with projections extending beyond the plane of the disc to act as blades. Preferably the projections are angled downwards so that in use they contact the surface of the powder in the secondary chamber.

The gas inlet is preferably connectable to an inert gas supply, with preferred gases typically being for example Argon, Helium or Nitrogen. This prevents oxidisation of the powder within the main chamber and during the manufacturing process.

The powder feeder is particularly suitable for microdelivery systems dealing with powders having a particle size of 1 to 40 microns and having an output rate of 2 to 10 grams per minute. Single constituent powders or mixtures of powders can be used within the secondary chamber and the powder particles can vary in size, and/or can have similar or different morphologies without impairing the functioning of these powder feeders. The feeder can be used on any type of organic and inorganic material for engineering, medical and foods application. In metal additive manufacturing, metal powders such as Tungsten and Cobalt, Carbon powders including graphite, and compounds such as Tungsten Carbide can be used.

The invention will now be described, by way of example, with reference to the accompanying drawings in which.

DESCRIPTION

Figure 1:
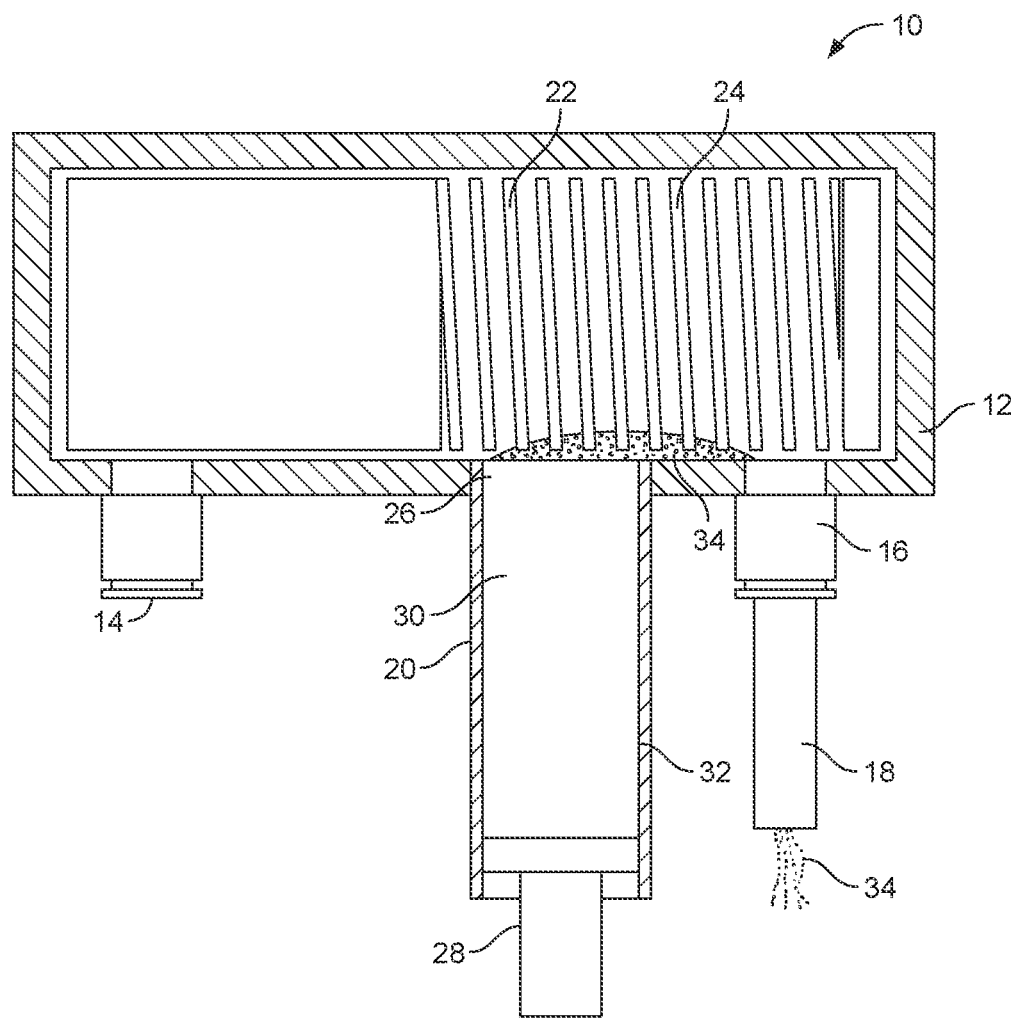
FIG. 1 shows a schematic view of a first embodiment of a powder feeder.

FIG. 1 shows a powder feeder 10 capable of feeding powder to a point where powder is injected into a manufacturing process using fine powder, such as an additive manufacturing process, laser metal deposition, selective laser melting or drug delivery processes for making pharmaceuticals. Powder feeder 10 comprises a main chamber 12 having a gas inlet 14, an outlet 16 connected to nozzle 18 and a secondary chamber 20 positioned beneath main chamber 12. Secondary chamber 20 and outlet 16 are placed proximal each other to ensure the powder has to travel as short a distance as possible through main chamber 12 before exit, with desirably the distance from chamber 20 to outlet 16 being less than 20 mm.

A driveable screw 22 is located within main chamber 12 so that threads 24 of screw 22 extend across an upper opening 26 in secondary chamber 20. Secondary chamber 20 further comprises a moveable piston 28. Typically screw 22 has a pitch of 5 to 15 mm and a working length of around 20 to 70 mm. Outlet 16 typically provides an aperture of around 2 to 4 mm in diameter.

Piston 28 is connected to an actuator, for example electric, pneumatic, hydraulic or other type of drive mechanism, and is configured to exert a small controllable upward motion on powder in chamber 20 so that the uppermost powder surface is at the correct height to be removed by the next pass of screw 22.

In use, powder 30 is placed into secondary chamber 20, and piston 28 positioned to contact the powder. Inert gas, such as Argon, Helium or Nitrogen, is introduced through inlet 14 to prevent oxidisation of the powder and stimulate powder travel and flows through main chamber 12 to exit at nozzle 18. If desired the gas can be pressurised, typically between 0.5 to 1.0 bar in excess of atmospheric pressure, with increases in pressure increasing the gas flow rate and so increasing the flow rate of powder through chamber 12. Typically the gas has a flow rate of 1 to 20 litres a minute.

A drive, such as a motor, continuously rotates screw 22, typically between 100 to 1800 rpm, and piston 28 is driven to urge powder cylinder 32 slowly upwards so operating as an anti-gravity feed and feeding from the bottom of main chamber 12 rather than the top of the main chamber. As the top surface of powder cylinder 32 emerges through opening 26, threads 24 shave a thin layer of powder, the layer typically being a single particle thick, off cylinder 32 and this layer breaks down into loose powder 34. Movement of threads 24, together with gas flow through the main chamber 12, transports powder 34 to outlet 16 where it drops down to leave nozzle 18 at the point where the powder is required in the manufacturing process. Synchronisation of the rate of rotation of screw 22 and upwards movement of piston 28 ensures a steady continuous flow of powder. By having a lateral transfer of the powder, gravity does not interfere with the flow rate.

As the uppermost layer is removed and transported from cylinder 32 to outlet 16, piston 28 continues to urge upwards towards screw 22, so pushing cylinder 32 upwards to contact threads 24 with then another layer removed. This process is continuous, the rate of piston drive matched to the rate of screw rotation to ensure a continuous flow of powder through nozzle 18.

If desired, although not shown, a plurality of secondary chambers can be provided, each with the same or a different powder, for example different elemental powders or different powder mixtures. The plurality of secondary chambers will typically be arranged linearly or as an array so that screw 22 travels across them all equally. The powder removed from each secondary chamber is mixed by the rotation of threads 24 and transported to outlet 16.

A feedback control can be used to monitor powder composition at the outlet and adjust rates of delivery from multiple secondary chambers so as to adjust powder delivery in real time. This is particularly useful if building a product by superimposing layers, as in 3D printing, and there is a requirement to vary the composition of different layers.

The powder can be partially compressed before the feeding process begins. Where secondary chamber 20 is detachable from main chamber 12, powder can be weighed in chamber 20 and then compressed to a known density using pistons at either end of chamber 20, and then connected to main chamber 12 with one piston remaining beneath the powder. This method is particularly suitable for partial compression of graphite. Partially compressing the powder ensures a consistent packing density of the powder, with gas pockets or loosely packed areas with a lower density removed and powder segregation prevented. This further improves consistency of powder delivery during the feeding process as it ensures that the thread, or other shaving element, removes a similar thickness layer with each pass over the top of cylinder 32. By partially compressing the powder, rather than the powder having a solid form, the powder readily reverts to loose powder formed of individual particles when the layer is shaved off cylinder 32. Alternatively pre-prepared cartridges of partially-compressed material can be used.

Compression of powder within the secondary chamber can be performed in any manner that provides reproducible compression for subsequent powder. The powder should desirably be partially compressed, not being solid. Other methods for achieving a consistent compression include a tap test where the same weight of powder is introduced into the secondary chamber and the sides of the secondary chamber tapped until the powder settles to a set level within the secondary chamber. Dynamic compression can also be used where the powder in the secondary chamber is initially uncompressed and then compressed just prior to the feeder starting.

Figure 2:
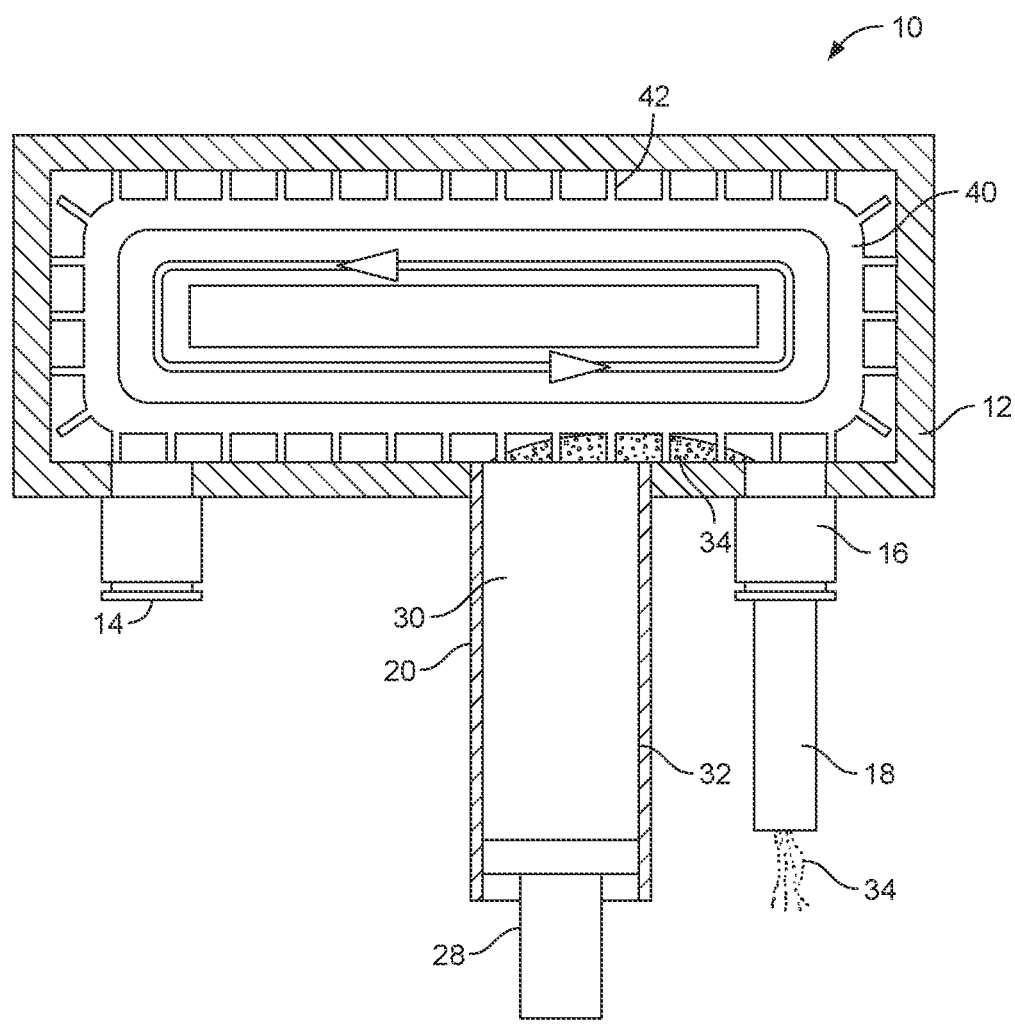
FIG. 2 shows a schematic view of a second embodiment of a powder feeder.

An alternative embodiment of the feeder is shown in FIG. 2 where screw 22 is replaced with a closed loop conveyor belt 40 with a plurality of equispaced transverse ridges 42 which act as a blade to remove a thin layer of powder when they pass across the top of cylinder 32. The rate of travel of belt 40 will typically be around 10 to 70 mm/minute.

Figure 3:
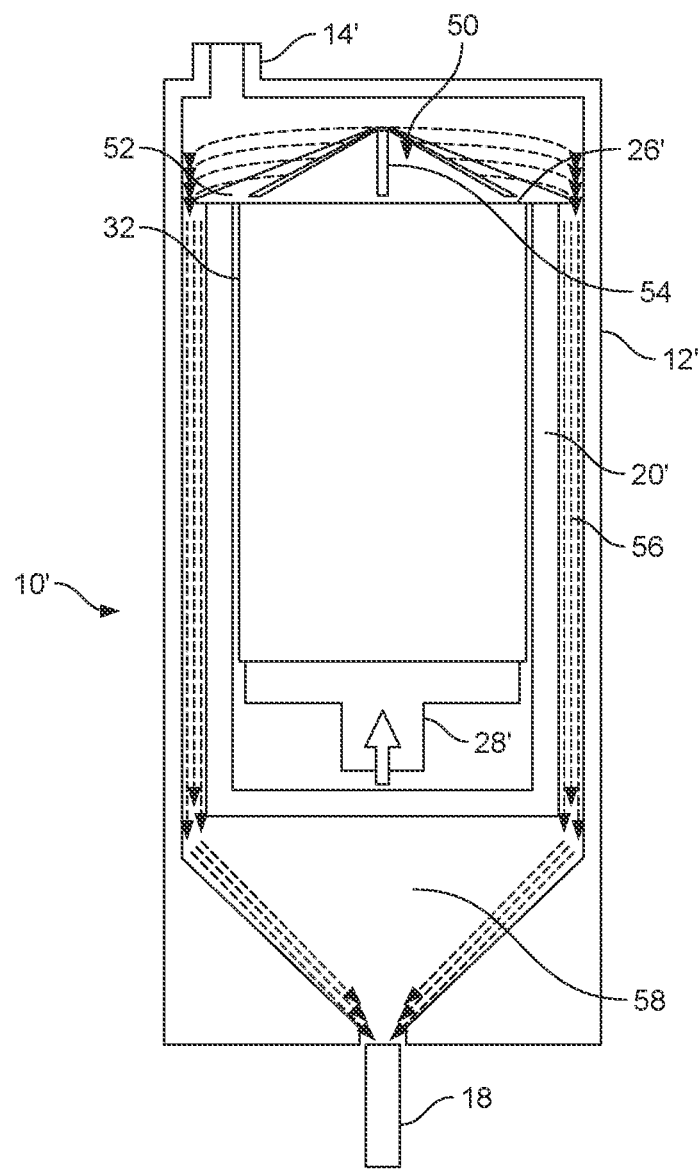
FIG. 3 shows a schematic view of a third embodiment of a powder feeder.
Figure 4:
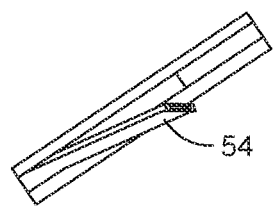
FIG. 4 shows a perspective view of part of the powder feeder shown in FIG. 3.

FIGS. 3 and 4 show a third embodiment where the secondary chamber 20' is located within main chamber 12'. A similar piston arrangement is used to urge cylinder 32 in an anti-gravity feed towards a shaving element 50 disposed directly above upper opening 26' of chamber 20'. Shaving element 50 comprises a rotatable disc 52 with downwardly extending protrusions 54 as shown in FIG. 4. Protrusions 54 are barbed such that they have a downwardly angled end which acts as a blade against the top layer of powder within cylinder 32. Piston 28' operates in a similar manner to the piston in FIGS. 1 and 2 acting to urge cylinder 32 upwards to encounter protrusions 54 and remove successive layers of the upper surface of cylinder 32 with each rotation of disc 52.

As the upper layer of partially compressed powder is removed, it falls under gravity downwards into annular gap 56 between secondary chamber 20' and main chamber 12' to reach funnel region 58 and feed into nozzle 18. Gas flowing from gas inlet 14' through main chamber 12' also assists with the powder flow and if desired main chamber 20' can be pressurised to around 0.5 to 1.0 bar above atmospheric pressure.

If desired, multiple secondary chambers can be provided arranged about a common axis such that their openings are arranged to be in substantially the same horizontal plane. Each secondary chamber can contribute a different powder into the main chamber. The powders within the secondary chambers can be single constituent powders, mixed powders or elemental powders.

This particular arrangement avoids issues with pulsation which may need to be resolved dependent on speed of operation of screw 22 in FIG. 1.

The powder feeders described are particularly suitable for microdelivery systems dealing with powders having a particle size of 1 to 40 microns and having an output rate of 2 to 10 grams per minute. The feed arrangement is operable for single constituent powders or for mixtures of powders within the secondary chamber and the powder particles can vary in size, and/or can have similar or different morphologies without impairing the functioning of these powder feeders. In particular the feeders are functionally operative for very fine powder mixed with coarse powder, mixtures of powders having spherical and non-spherical particles, combinations of flakey and spherical powders, and mixtures of powders with different densities. The feeder can be used on any type of powder, such as metal powders such as Tungsten and Cobalt, Carbon powders including graphite, and compounds such as Tungsten Carbide. The feeders above are operative for graphite of less than 20 microns without any blockage or impairment of the main chamber or blade element.

All powder introduced into the secondary chamber of the feeders is ejected as there is no powder segregation or clogging by powder within the feeders. There is no need to pre-treat powders before use, for example by gas atomisation to make all particles spherical, as poor flowing materials, materials with different flow properties, and particles of different shapes all travel consistently through the feeder to reach the output Where possible, the elements forming powder feeders 10, 10' are made from anti-static materials.

If desired, a heating jacket can be disposed around the main chamber so as to remove any incidental moisture, with typically the jacket producing a temperature up to 100° C.

The invention claimed is:

1. A powder feeder comprising a main chamber with a gas inlet and a combined powder and gas outlet, at least one secondary chamber configured to receive powder and a shaver element, wherein the gas inlet is connected to gas pressurised between 0.5 to 1 bar in excess of atmospheric pressure, the shaver element is positioned directly above an opening in the at least one secondary chamber and the at least one secondary chamber further comprises a piston movable upwards towards the shaver element to provide an anti-gravity powder feed and to allow the shaver element to remove a thin layer of powder for lateral transfer through the main chamber to exit through the combined powder and gas outlet, in use gas passing from the gas inlet to the combined powder and gas outlet and so assisting with the lateral transfer of the powder to the combined powder and gas outlet.

2. The powder feeder according to claim 1, wherein the at least one secondary chamber is configured to receive partially compressed powder.

3. The powder feeder according to claim 1, wherein the at least one secondary chamber is disposed within the main chamber.

4. The powder feeder according to claim 1, wherein the at least one secondary chamber is externally connected to the main chamber.

5. The powder feeder according to claim 1, wherein the powder outlet is positioned proximal to the at least one secondary chamber.

6. The powder feeder according to claim 1, further comprising a plurality of secondary chambers.

7. The powder feeder according to claim 6, wherein the plurality of secondary chambers are linearly spaced apart.

8. The powder feeder according to claim 6, wherein the plurality of secondary chambers are positioned around a common axis such that their openings are arranged to be in substantially the same horizontal plane.

9. Powder feeder according to claim 1, wherein the at least one secondary chamber is detachable from the main chamber.

10. The powder feeder according to claim 1, wherein the shaver element comprises a rotatable screw.

11. The powder feeder according to claim 10, wherein an axis of rotation of the screw extends across the opening.

12. The powder feeder according to claim 10, wherein the rotatable screw is rotated at a speed of between 100 to 1800 rpm.

* * * * *